(12) United States Patent
Woo (10) Patent No.: US 9,978,091 B2
(45) Date of Patent: May 22, 2018

(54) METHOD AND SYSTEM FOR TRACKING MARKETING CHANNEL OF APPLICATION

(71) Applicant: NHN PAYCO CORPORATION, Seongnam-si (KR)

(72) Inventor: Seungbeom Woo, Seongnam-si (KR)

(73) Assignee: NHN PAYCO CORPORATION, Seongnam-si (KR)

(*) Notice: Subject to any disclaimer, the term of this patent is extended or adjusted under 35 U.S.C. 154(b) by 445 days.

(21) Appl. No.: 14/698,241

(22) Filed: Apr. 28, 2015

(65) Prior Publication Data

US 2015/0310517 A1    Oct. 29, 2015

(30) Foreign Application Priority Data

Apr. 29, 2014 (KR) .................. 10-2014-0051611

(51) Int. Cl.
*G06Q 30/06* (2012.01)
*G06Q 30/02* (2012.01)

(52) U.S. Cl.
CPC ......... *G06Q 30/0619* (2013.01); *G06Q 30/02* (2013.01); *G06Q 30/0613* (2013.01); *G06Q 30/0617* (2013.01)

(58) Field of Classification Search
None
See application file for complete search history.

(56) References Cited

U.S. PATENT DOCUMENTS

| | | | |
|---|---|---|---|
| 7,962,424 B1* | 6/2011 | Colosso | G06F 21/105 380/201 |
| 8,396,759 B2* | 3/2013 | Mehta | G06Q 30/0282 455/456.3 |
| 8,559,931 B2* | 10/2013 | Moon | H04W 4/001 455/414.2 |
| 8,732,697 B2* | 5/2014 | Jonnala | G06Q 30/02 717/101 |
| 9,325,795 B2* | 4/2016 | Kim | G06F 17/30861 |
| 2008/0270301 A1* | 10/2008 | Jones | G06Q 20/02 705/41 |
| 2010/0235264 A1* | 9/2010 | Fernandez Gutierrez | G06Q 30/0185 705/26.1 |

(Continued)

FOREIGN PATENT DOCUMENTS

| | | |
|---|---|---|
| KR | 10-2011-0113232 | 10/2011 |
| KR | 10-2013-0015497 | 2/2013 |
| KR | 10-2013-0133073 | 12/2013 |

OTHER PUBLICATIONS

Teng, S., "Apsalar: As apps pile up, developers should focus on app engagement metrics," FierceDeveloper, Jan. 25, 2013.*

*Primary Examiner* — Nicholas D Rosen
(74) *Attorney, Agent, or Firm* — H.C. Park & Associates, PLC (57) ABSTRACT

A method and system for tracking a marketing channel of an application is disclosed. A marketing channel tracking method includes generating identification information for identifying an editor and an application corresponding to the editor that provides a marketing channel of the application, transferring the identification information from the editor through a user terminal, and storing the identification information corresponding to a user terminal in response to the user terminal downloading the application through the marketing channel.

7 Claims, 6 Drawing Sheets

(56) References Cited

U.S. PATENT DOCUMENTS

| | | | |
|---|---|---|---|
| 2010/0280892 A1* | 11/2010 | Uzunalioglu | G06Q 30/02 705/14.13 |
| 2011/0105150 A1* | 5/2011 | Moon | H04W 4/001 455/456.3 |
| 2011/0250872 A1* | 10/2011 | Kim | G06F 17/30861 455/414.1 |
| 2011/0320307 A1* | 12/2011 | Mehta | G06Q 30/0282 705/26.7 |
| 2012/0036507 A1* | 2/2012 | Jonnala | G06Q 30/02 717/178 |
| 2012/0089521 A1* | 4/2012 | Abrevaya | G06Q 20/401 705/75 |
| 2013/0148024 A1* | 6/2013 | Shin | G06Q 20/40 348/552 |
| 2013/0253999 A1* | 9/2013 | Pinkus | G06Q 30/02 705/14.16 |
| 2013/0325573 A1* | 12/2013 | Park | G06Q 30/0241 705/14.16 |

\* cited by examiner

METHOD AND SYSTEM FOR TRACKING MARKETING CHANNEL OF APPLICATION

CROSS-REFERENCE TO RELATED APPLICATION

This application claims priority from and the benefit of Korean Patent Application No. 10-2014-0051611, filed on Apr. 29, 2014, which is hereby incorporated by reference for all purposes as if fully set forth herein.

BACKGROUND OF THE INVENTION

Field

Exemplary embodiments relate to a technology for tracking a marketing channel of an application.

Discussion of the Background

A smartphone in addition to features of a general cellular phone allows installing an application program (App) based on a purpose, and to utilize the installed App.

Recently, online "mobile contents market" is gaining popularity allowing users to readily sell and purchase Apps. The mobile contents market is also referred to as an Appstore indicating application store.

Each user may download a desired App through an Appstore, and may install and utilize the downloaded App in a user terminal. An Appstore may provide download pages for individual Apps. Each download page may provide a link for downloading an App to a user terminal.

As an example of a technology for providing an Appstore, Korean Laid-Open Publication No. 10-2011-0113232, published on Oct. 17, 2011, discloses a technology that enables a portable terminal to select and utilize at least one desired Appstore from a plurality of Appstores.

SUMMARY

One or more exemplary embodiments provide a method and system for tracking a marketing channel that induces downloading of an application.

One or more exemplary embodiments provide a method and system for tracking a marketing channel by matching a marketing channel and a user.

Additional features of the invention will be set forth in the description which follows, and in part will be apparent from the description, or may be learned by practice of the invention.

One or more exemplary embodiments disclose a marketing channel tracking method including generating identification information, to identify an editor and an application corresponding to the editor, the editor providing a marketing channel of the application; transferring the identification information from the editor through a user terminal; and storing the identification information corresponding to the user terminal in response to the user terminal downloading the application through the marketing channel.

One or more exemplary embodiments disclose a marketing channel tracking system including a memory to which programming is loaded; and a processor, wherein, according to a control of the programming, the processor is configured to: perform a process of generating identification information, to identify an editor and an application corresponding to the editor, the editor providing a marketing channel of the application; perform a process of transferring the identification information from the editor to a user terminal through the marketing channel; and perform a process of storing the identification information corresponding to a user terminal in response to the user terminal downloading the application through the marketing channel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments, and together with the description serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of components, etc., may be exaggerated for clarity and descriptive purposes. Also, like reference numerals denote like elements.

When a component is referred to as being "on," "connected to," or "coupled to" another component, it may be directly on, connected to, or coupled to the other component or intervening components may be present. When, however, a component is referred to as being "directly on," "directly connected to," or "directly coupled to" another component, there are no intervening components present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various features, these features should not be limited by these terms. These terms are used to distinguish one feature from another. Thus, a first feature could be termed a second feature without departing from the teachings of the present disclosure.

Spatially relative terms, such as "beneath," "below," "lower," "above," "upper," and the like, may be used herein for descriptive purposes, and, thereby, to describe one feature's relationship to another feature as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

Hereinafter, exemplary embodiments will be described with reference to the accompanying drawings.

A marketing channel tracking system and a marketing channel tracking method according to one or more exemplary embodiments may mutually associate and manage applications, editors promoting the applications, and users having downloaded the applications through the editors. Accordingly, the marketing channel tracking system and the marketing channel tracking method may track a marketing channel of editors that promote applications by matching a marketing channel and a user. The terms "application(s)" and "App(s)" may be interchangeably used throughout.

Figure 1:
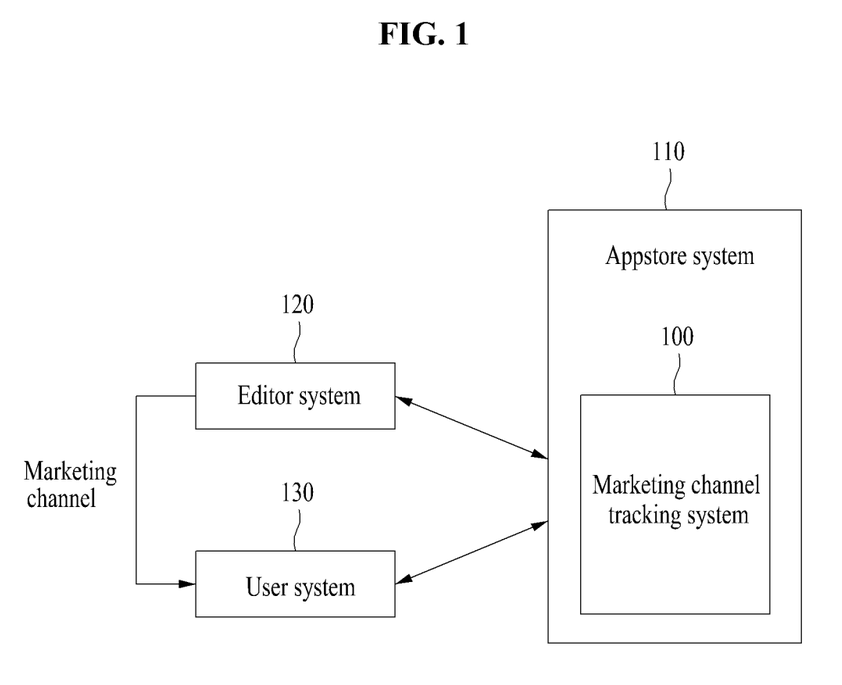
FIG. 1 illustrates a marketing channel tracking system according to one or more exemplary embodiments.

FIG. 1 illustrates a marketing channel tracking system according to one or more exemplary embodiments. FIG. 1 illustrates marketing channel tracking system 100, editor system 120, and user system 130. Each of marketing channel tracking system 100, editor system 120, and user system 130 may be configured as a computer system including a memory, a processor, and a network interface, and may communicate with other system using the network interface.

Marketing channel tracking system 100 may be configured as a system included in an Appstore or a system affiliated with the Appstore. An example of marketing channel tracking system 100 included in an Appstore system 110 will be described with reference to FIG. 1. A developer system (not shown) that is an apparatus used by developers may be connected to Appstore system 110 over a network according to a control of a developer. The developer system may upload information about an application developed by the developer and an installation file for installing the application, and may determine whether to perform a promotion of the application using an editor.

Editor system 120 may include an apparatus used by an editor to communicate with marketing channel tracking system 100 over the network. Editor system 120 may select a predetermined application based on information about applications provided from marketing channel tracking system 100 within Appstore system 110. For example, marketing channel tracking system 100 may store and manage the selected application and the editor in a database through mutual association between the selected application and the editor. The editor may promote the selected application to users through a marketing channel.

The term "marketing channel" may include an online route through which editors promote applications to users and induce the users to download the applications. As an example of the online route, an editor may set information about an application and a link to a download page of the application on a mobile homepage of the editor. In this instance, a user having visited the mobile homepage through a terminal may download and install the application by visiting the download page through the link.

Also, the editor may be identified as a specific site or a specific company without being limited to a specific person. For example, a specific company may promote an application using various online marketing channels of the specific company. For example, a company providing game related information may draw interest of users by displaying a banner advertisement about a game application through a site of the company.

An editor connected to Appstore system 110 through editor system 120 may select a desired application from among applications and may promote the selected application through the marketing channel. A user may download and install the application in user system 130 in response to a promotion of the editor. For example, the marketing channel may provide a link to a download page of an application provided from Appstore system 110, and user system 130 may download the application from Appstore system 110 through the link and may install the downloaded application in user system 130.

In one or more exemplary embodiments, marketing channel tracking system 100 may track an inflow route of a user by matching user system 130 and a marketing channel of an editor of an application downloaded to user system 130. Marketing channel tracking system 100 may entirely or substantially track the application by matching the marketing channel and the user within Appstore system 110. An exemplary method of marketing channel tracking system 100 associating a user having downloaded an application through a variety of marketing channels and a marketing route of an editor will be further described below.

User system 130 may include a user device. For example, user system 130 may be a device such as a smartphone capable of downloading and installing an application promoted through a marketing channel. When an Appstore App is installed in user system 130 and user system 130 has joined a service provided from the Appstore App, marketing channel tracking system 100 may easily track that user system 130 has downloaded and installed the application through the marketing channel of editor system 120. Further, when the Appstore App is not installed in user system 130, marketing channel tracking system 100 may track a user not having installed the Appstore App among users having entered through the marketing channel by matching user system 130 and the marketing channel through which user system 130 has entered.

Hereinafter, an exemplary method of matching an editor and a user will be described.

Figure 2:
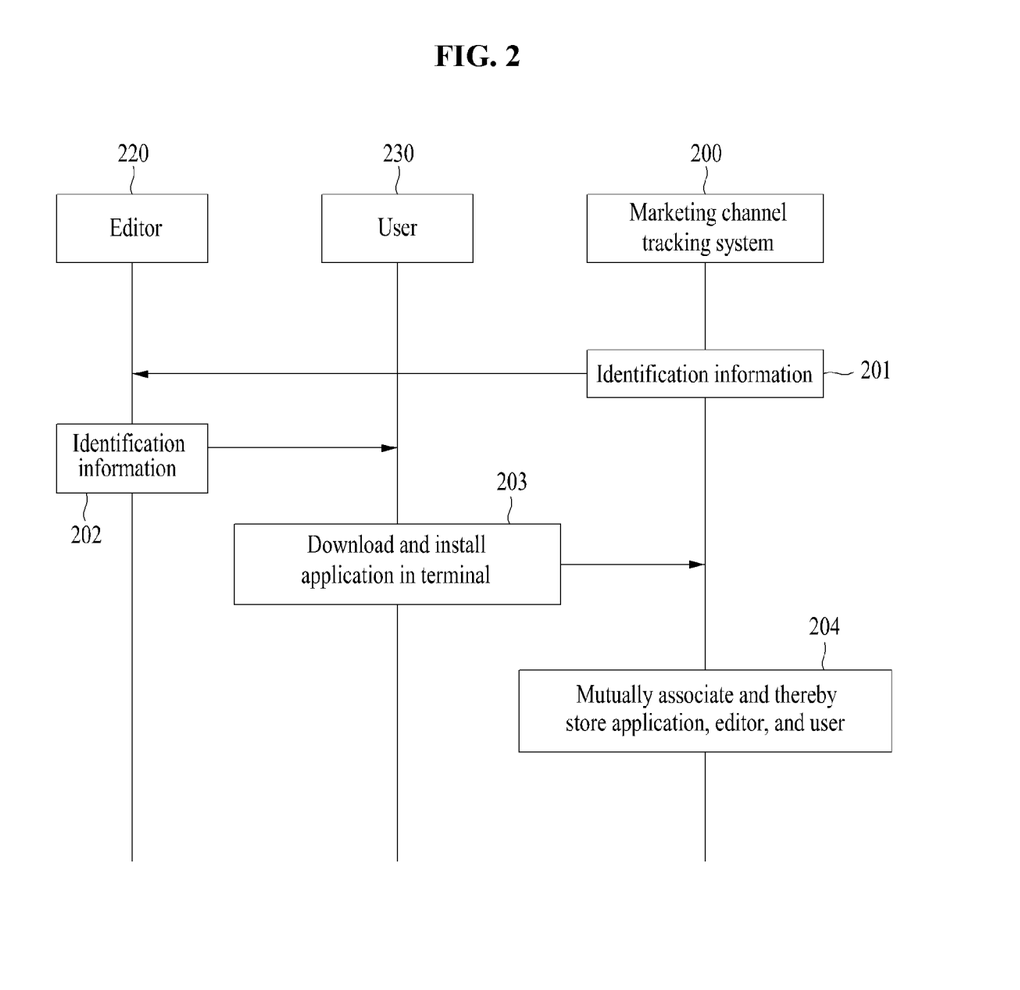
FIG. 2 illustrates a marketing channel tracking process according to one or more exemplary embodiments.

FIG. 2 illustrates a marketing channel tracking process according to one or more exemplary embodiments. As shown in FIG. 2, a marketing channel tracking process may be performed between marketing channel tracking system 200, editor 220, and user 230. Data delivery among marketing channel tracking system 200, editor 220, and user 230 may be performed through data communication using a network among devices corresponding to marketing channel tracking system 200, editor 220, and user 230.

In operation 201, marketing channel tracking system 200 may provide identification information to editor 220. For example, marketing channel tracking system 200 may allocate an editor identifier to editor 220 which may promote a predetermined application, may generate identification information including the editor identifier and an application identifier of the application to be promoted by editor 220, and may provide the identification information to editor 220. The application identifier may include, for example, an identification code of the application and a uniform resource locator (URL) of an Appstore webpage provided to download the application.

In operation 202, editor 220 may provide identification information to user 230 that is to download the application through a marketing channel. For example, a page of editor 220 provided as the marketing channel may include a link to an Appstore webpage providing downloading of the application and a function of transmitting identification information to a terminal of user 230 having selected the link.

In operation 203, user 230 may download and install the application in the terminal of user 230. For example, user 230 may move to an Appstore webpage by clicking an advertisement banner of an application that is to be downloaded to the terminal of user 230, and may download and install the application. For example, user 230 may connect to the Appstore webpage through the terminal using a link provided from an online marketing channel. Identification information transferred from editor 220 to user 230 may be transmitted from user 230 to marketing channel tracking system 200 through the Appstore App or the Appstore webpage. A user identifier for identifying user 230 may be further transmitted to marketing channel tracking system 200. A process of transferring identification information to marketing channel tracking system 200 will be further described below.

In operation 204, marketing channel tracking system 200 may mutually associate and thereby store the application, editor 220, and user 230. For example, marketing channel tracking system 200 may mutually associate and thereby store the user identifier and the editor identifier and the application identifier included in the identification information.

Accordingly, marketing channel tracking system 200 may track a marketing channel that promotes a predetermined application by matching the marketing channel and user 230, and induces downloading of the application by mutually associating and thereby storing the application, editor 220, and user 230.

Figure 3:
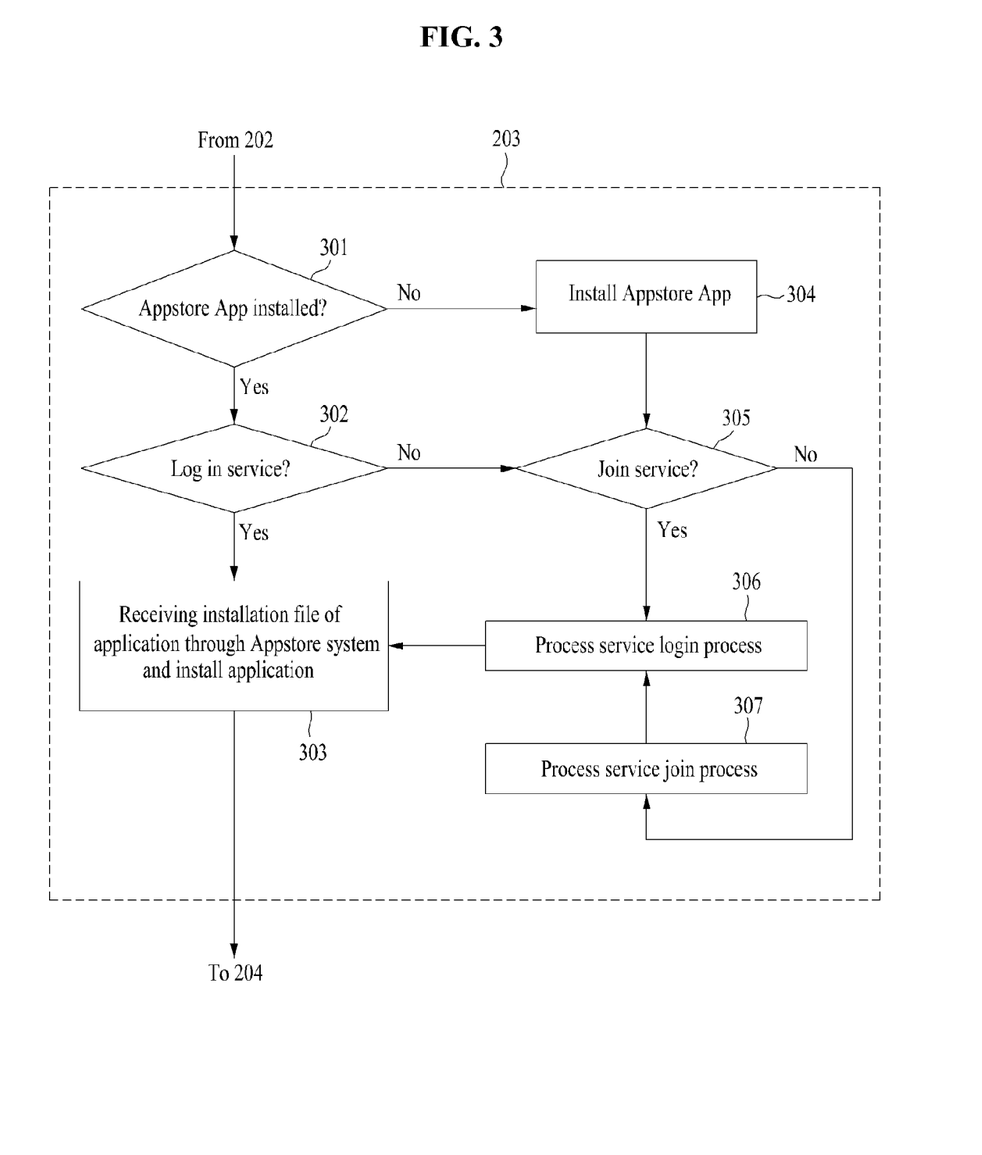
FIG. 3 illustrates an example of a process of transferring identification information according to one or more exemplary embodiments.

FIG. 3 illustrates an example of a process of transferring identification information according to one or more exemplary embodiments. Operations 301 through 307 including the transfer process of FIG. 3 may be included in operation 203 of FIG. 2, and may be performed by user 230. As described above, user 230 may be substantially the device of user 230. Hereinafter, an example of operations 301 through 307 performed by the terminal of user 230 will be described.

In operation 301, the terminal of user 230 may connect to the Appstore webpage through the link provided from editor 220, and then may determine whether the Appstore App is installed. When the Appstore App is installed, the terminal of user 230 may perform operation 302. If the Appstore App is not installed in the terminal of user 230, the terminal of user 230 may perform operation 304. The Appstore App may be, for example, an application provided from an Appstore system.

The Appstore webpage may determine whether the Appstore App is installed in the terminal of user 230, redirect to a download page of an application when the Appstore App is installed, and provide an installation file of the Appstore App when the Appstore App is not installed.

In operation 302, the terminal of user 230 may determine whether user 230 has logged in a service. When user 230 has logged in the service, the terminal of user 230 may perform operation 303. If user 230 has not logged in the service, the terminal of user 230 may perform operation 305. The service may be provided through, for example, the Appstore App.

In operation 303, the terminal of user 230 may receive the installation file of the application through the Appstore system and may install the application. User 230 may connect to the Appstore webpage through the link provided from editor 220. When the Appstore App is installed in the terminal of user 230, user 230 may be redirected to the download page of the application that user 230 may download.

As described above, when the Appstore App is installed in the terminal of user 230 and user 230 has logged in the service provided through the Appstore App, the terminal of user 230 may recognize identification information provided from editor 220 and may transfer the recognized identification information to marketing channel tracking system 200 according to a control of the Appstore App. For example, the Appstore App may control the terminal of user 230 to recognize identification information transferred through the marketing channel and to transfer the recognized identification information to marketing channel tracking system 200.

In operation 304, the terminal of user 230 may install the Appstore App. For example, when the Appstore App is not installed, identification information provided from editor 220 through the Appstore webpage may be transferred to marketing channel tracking system 200. The terminal of user 230 may receive the installation file of the Appstore App through connection to an installation page of the Appstore App according to a control of marketing channel tracking system 200 and may install the Appstore App using the received installation file.

The terminal of user 230 may perform operation 306 when user 230 has joined the service in operation 305. When user 230 has not joined the service, the terminal of user 230 may perform operation 307.

In operation 306, the terminal of user 230 may log in a service. For example, the terminal of user 230 may transfer information input from user 230 to log into the service provided by marketing channel tracking system 200 or the Appstore system. When user 230 logs into the service, the terminal of user 230 may perform operation 303.

In operation 307, the terminal of user 230 may join a service. For example, the terminal of user 230 may transfer information input from user 230 to log into the service provided by marketing channel tracking system 200 or the Appstore system. When user 230 joins the service, the terminal of the user 230 may proceed to operation 306.

As described above, when the Appstore App is installed in operation 301 and when user 230 has joined in the service provided through the Appstore App in operation 302, marketing channel tracking system 200 may easily track that user 230 has downloaded and installed the application through the marketing channel of editor 220. When the Appstore App is not installed in operation 301, marketing channel tracking system 200 may not readily verify whether user 230 has downloaded and installed the application through marketing channel of the editor 220. Accordingly, marketing channel tracking system 200 may track a user who has not installed the Appstore App based on identification information provided from editor 220 to user 230 through the Appstore webpage.

A process of tracking a user who has not installed an Appstore App among users having been allowed to enter through the marketing channel of editor 220 will be further described below.

Figure 4:
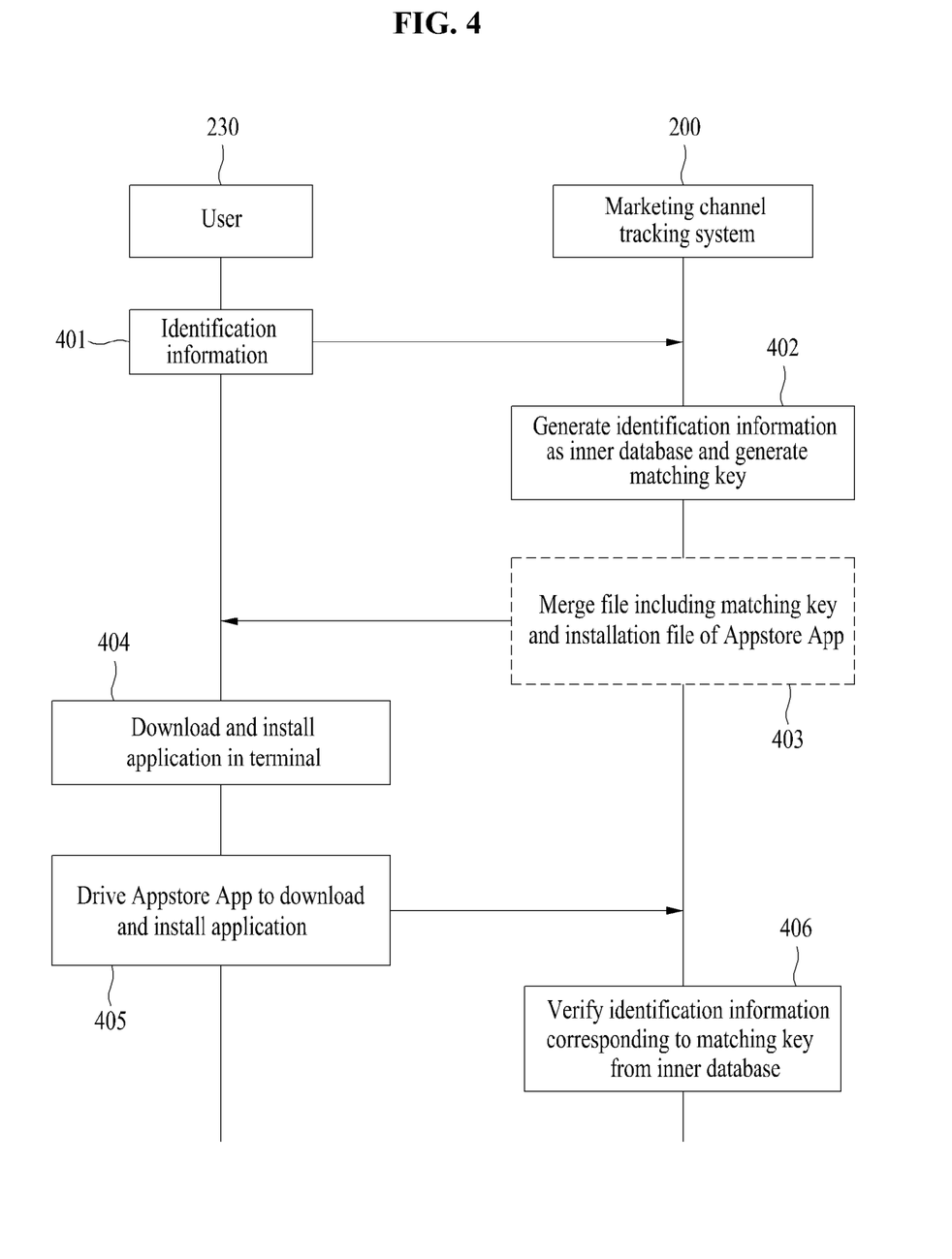
FIG. 4 illustrates a method of tracking a user having not installed an Appstore App according to one or more exemplary embodiments.

FIG. 4 illustrates a method of tracking a user who has not installed an Appstore application according to one or more exemplary embodiments. Operations 401 through 406 included in a marketing channel tracking process of FIG. 4 may be performed through, for example, data communication using a network between marketing channel tracking system 200 and user 230.

In operation 401, since an Appstore App is not installed on a terminal of user 230, the terminal of user 230 may transmit identification information transferred from editor 220 through an Appstore webpage to marketing channel tracking system 200.

In operation 402, marketing channel tracking system 200 may fetch identification information transferred from editor 220 to user 230 through the Appstore webpage, may generate the identification information as an inner database, and may generate a unique matching key corresponding to the identification information.

In operation 403, marketing channel tracking system 200 may merge a file including the matching key and an installation file of the Appstore App and may provide a link to download the merged file to the terminal of user 230. For example, marketing channel tracking system 200 may transmit the generated matching key to a repack server, may include desired information in a txt file, and may merge the txt file and a duplicate Appstore apk file. When the files are merged, the merged file on the Appstore webpage may be activated at the terminal of user 230.

In operation 404, the terminal of user 230 may install the Appstore App by downloading the merged file through the Appstore webpage. For example, the Appstore App may be downloaded and installed in the terminal of user 230 in response to an input of user 230 on a download button activated on the Appstore webpage.

In operation 405, the terminal of user 230 may drive the Appstore App installed in operation 404 to retry downloading the application that failed to be downloaded due to the Appstore App not being installed. The terminal of user 230 may retrieve a file including the matching key from the merged file, and may transmit the matching key to marketing channel tracking system 200. For example, once the Appstore App is driven, the terminal of user 230 may retrieve the txt file from the downloaded file and may transmit the matching key included in the txt file to marketing channel tracking system 200 when downloading the application through the Appstore App.

In operation 406, marketing channel tracking system 200 may perform information matching by matching the matching key received from the terminal of user 230 and the inner database generated in operation 402. The marketing channel tracking system 200 may verify, from the inner database, identification information corresponding to the matching key transferred from the terminal of user 230, and may mutually associate and thereby store the application, editor 220, and user 230.

Accordingly, when downloading the application to the terminal of user 230, marketing channel tracking system 200 may track the marketing channel of editor 220 having promoted the application by mutually associating and thereby storing the application, editor 220, and user 230. Further, with respect to a user having not installed the Appstore App among users having been allowed to enter through marketing channel of the editor 220, marketing channel tracking system 200 may support an installation of the Appstore App and then track the marketing channel of editor 220.

Figure 5:
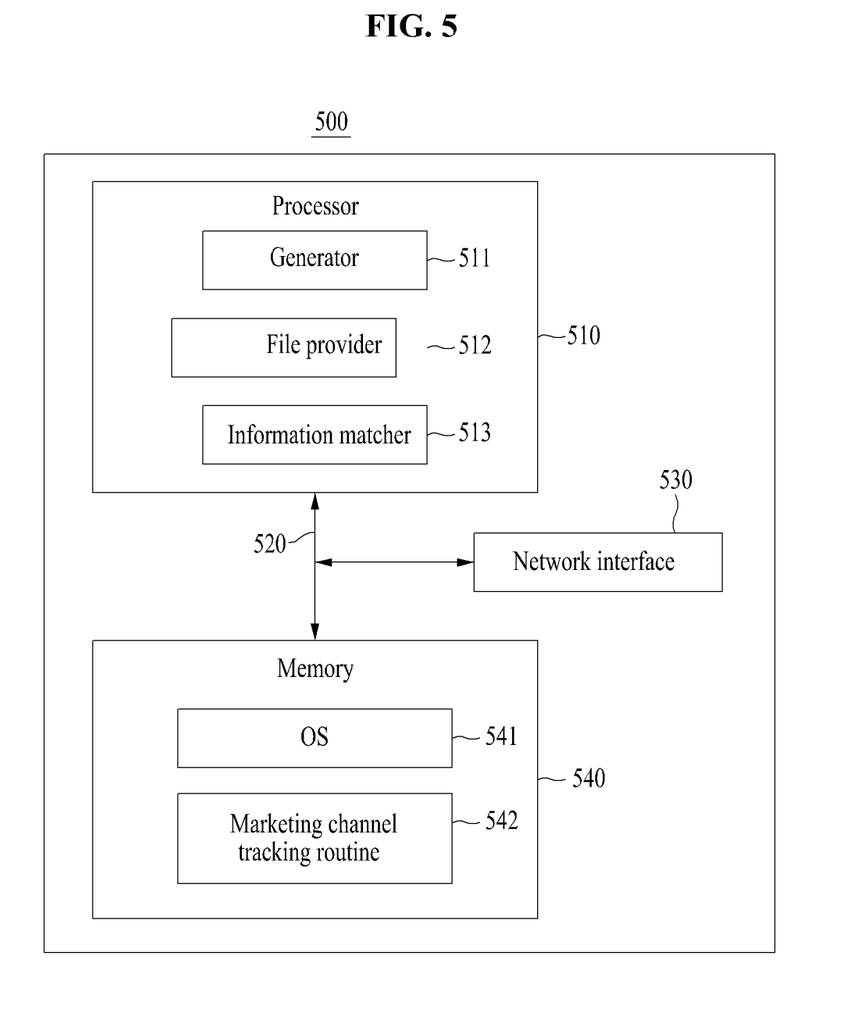
FIG. 5 illustrates a configuration of a marketing channel tracking system according to one or more exemplary embodiments.
Figure 6:
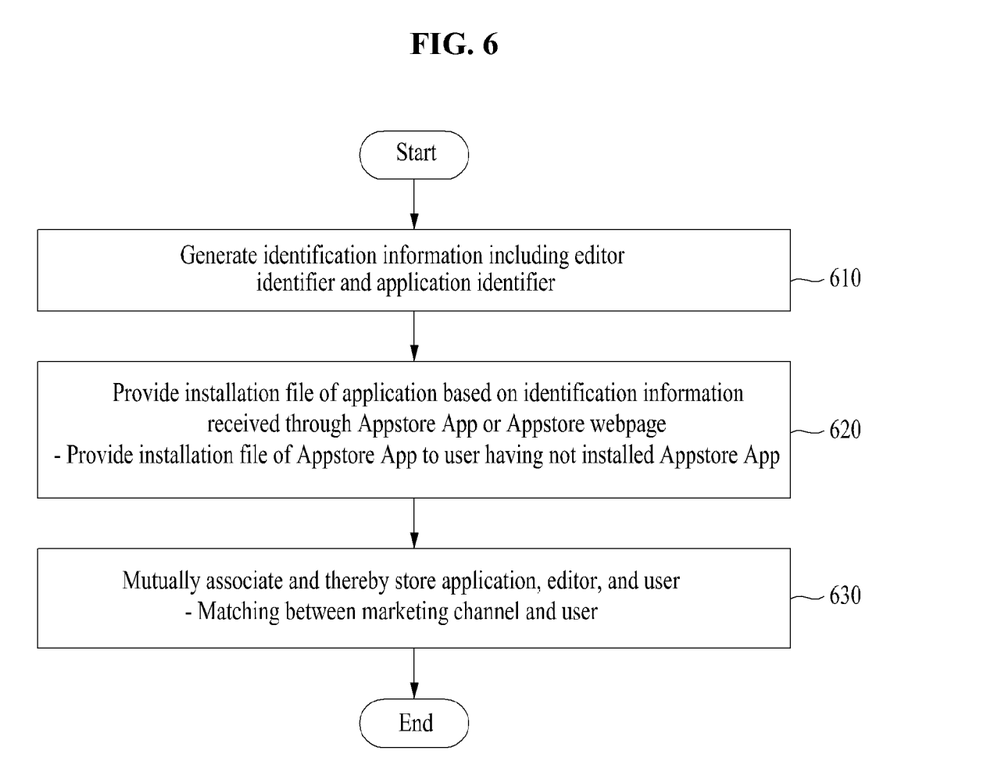
FIG. 6 illustrates a marketing channel tracking method according to one or more exemplary embodiments.

FIG. 5 illustrates a configuration of a marketing channel tracking system according to one or more exemplary embodiments, and FIG. 6 illustrates a marketing channel tracking method according to one or more exemplary embodiments.

Marketing channel tracking system 500 may include processor 510, bus 520, network interface 530, and memory 540. Memory 540 may include operating system (OS) 541 and marketing channel tracking routine 542. Processor 510 may include generator 511, file provider 512, and information matcher 513. According to one or more exemplary embodiments, marketing channel tracking system 500 may include an additional elements not illustrated in FIG. 5. For example, marketing channel tracking system 500 may also include, for example, a display and a transceiver, but aspects of the invention are not limited thereto.

Memory 540, as non-transitory computer-readable recording media, may include a permanent mass storage device such as random access memory (RAM), read only memory (ROM), and a disk drive. A program code for OS 541 and marketing channel tracking routine 542 may be stored in memory 540. The software constituent elements may be loaded from non-transitory computer-readable media separate from memory 240 using a drive mechanism (not shown). The non-transitory computer-readable media may include computer-readable media such as, for example, a floppy disk, a tape, a DVD/CD-ROM drive, and a memory card. According to one or more exemplary embodiments, the software constituent elements may be loaded to memory 540 through network interface 530.

Bus 520 may enable communication and data transmission between the elements of marketing channel tracking system 500. Bus 520 may be configured using a high-speed serial bus, a parallel bus, a storage area network (SAN), and/or other appropriate communication technologies.

Network interface 530 may be a computer hardware element to connect marketing channel tracking system 500 to a computer network. Network interface 530 may connect marketing channel tracking system 500 to the computer network through a wireless or wired connection.

Processor 510 may be configured to process an instruction of a computer program by performing a basic arithmetic and logic operation, and an input/output (I/O) operation of marketing channel tracking system 500. The instruction may be provided from memory 540 or network interface 530 to processor 510 through bus 520. Processor 510 may be configured to execute a program code for generator 511, file provider 512, and information matcher 513. The program code may be stored in a storage device such as memory 540.

Generator 511, file provider 512, and information matcher 513 may be configured to perform operations 610 through 630 of FIG. 6.

In operation 610, generator 511 may allocate an editor identifier to an editor, may generate identification information including the editor identifier and an application identifier of an application that the editor may promote, and may provide the identification information to the editor. The application identifier may include an identification code of the application and a URL of an Appstore webpage provided to download the application. To track a marketing channel of the application, generator 511 may generate and provide identification information including the editor identifier and the application identifier with respect to the editor that promotes the application. Accordingly, the editor may provide identification information to a user terminal that may download the application promoted by the editor through the marketing channel, and the user terminal may transmit the identification information received from the editor to download the application to marketing channel tracking system 500 through an Appstore App or the Appstore webpage. The user terminal may also transmit user identification information for identifying a user when transmitting the identification information received from the editor.

In operation 620, file provider 512 may identify the application that the user is to download based on the identification information received from the user terminal, and may provide, to the user terminal, a link for downloading an installation file of the application. File provider 512 may enable downloading of the application within the Appstore App. When a user has installed the Appstore App, file provider 512 may fetch identification information transmitted from the editor to the user, may identify the application based on the identification information, and then may provide the link for downloading the application through the Appstore App. When a user has not installed the Appstore App, file provider 512 may fetch identification information transmitted from the editor to the user through the Appstore webpage, may induce the user to install the Appstore App and then may enable downloading of the application when the Appstore App is installed. For example, file provider 512 may generate identification information fetched through the Appstore webpage as an inner database with respect to the user who has not installed the Appstore App, may generate a unique matching key corresponding to the identification information, and then may provide a link for downloading a file in which a file including the matching key and an installation file of the Appstore App are merged on the Appstore webpage. Accordingly, the user terminal may install the Appstore App by downloading the merged file through the Appstore webpage. Once the installed Appstore App is driven, the user terminal may retrieve the file including the matching key from the downloaded file, and may transmit the matching key to marketing channel tracking system 500 through the Appstore App.

In operation 630, information matcher 513 may receive, from the user terminal, identification information transmitted from the editor and the user identifier, and may mutually associate the identification information and store the application, the editor, and the user. For example, information matcher 513 may track the marketing channel of the application through matching the user and the marketing channel that are mutually associated, and thereby may store the user identifier and the application identifier and the editor identifier included in the identification information. When the user terminal in which the Appstore App is not installed installs the Appstore App and then transmits the matching key, information matcher 513 may verify, from the inner database, identification information from the matching key transmitted from the user terminal and may perform matching between the marketing channel and the user.

A marketing channel tracking method and a marketing channel tracking system according to one or more exemplary embodiments may track a marketing channel of an application through matching information between a marketing channel of an editor promoting the application and a user having downloaded the application.

As described above, according to one or more exemplary embodiments, when downloading an application, a match between a marketing channel and a user may be performed near real time without using a separate operation time by mutual association and storing the application, an editor, and the user. It may be possible to track the marketing channel of the application with high accuracy through matching the marketing channel and the user. In particular, by initially supporting a user who has not installed an Appstore App to install the Appstore App, and then matching the marketing channel and the user when the user is downloading the application, it is possible to track the user who has not installed the Appstore App among users having been allowed to enter through the marketing channel.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments of the present invention, or vice versa.

Although exemplary embodiments have been shown and described, the present invention is not limited to the described exemplary embodiments. It would be appreciated by those skilled in the art that changes may be made to these example embodiments without departing from the principles and spirit of the invention, the scope of which is defined by the claims and their equivalents.

What is claimed is:

1. A marketing channel tracking method comprising:
generating identification information to identify an editor and an application corresponding to the editor, the editor providing a marketing channel of the application;
transferring the identification information from the editor via a user terminal to a marketing channel tracking system; and
storing the identification information received from the user terminal in response to the user terminal downloading the application via the marketing channel,
wherein the storing comprises:
identifying a download of the application via the marketing channel using the identification information transferred from the editor via the user terminal to the marketing channel tracking system;
identifying the application using the identification information;
providing a link for downloading the application to the user terminal in response to an Appstore App for providing an Appstore service being installed in the user terminal;
storing the identification information in association with the user terminal in response to the application being installed in the user terminal and the identification information being received from the user terminal via the Appstore App;
storing the identification information in a database and generating a matching key for the identification information in response to a determination of the Appstore App not being installed in the user terminal;
providing, to the user terminal, a link for downloading a file, the file comprising the matching key and an installation file of the Appstore App being merged; and
verifying the identification information corresponding to the matching key from the database in response to the Appstore App being installed in the user terminal and the matching key being received from the user terminal via the Appstore App.

2. The method of claim 1, wherein the editor promotes the application and induces the user terminal to download the application via an online route configured in the marketing channel.

3. The method of claim 1, wherein an Appstore App installed in the user terminal to provide an Appstore service controls transfer of the identification information.

4. A non-transitory computer-readable recording medium storing a program to implement a method, the method comprising:
generating identification information, to identify an editor and an application corresponding to the editor, the editor providing a marketing channel of the application;
receiving the identification information from the editor via a user terminal; and
storing the identification information received from the user terminal in response to the user terminal downloading the application via the marketing channel,
wherein the storing comprises:
identifying a download of the application via the marketing channel using the identification information transferred from the editor via the user terminal;
identifying the application using the identification information;
providing a link for downloading the application to the user terminal in response to an Appstore App for providing an Appstore service being installed in the user terminal;
storing the identification information in association with the user terminal in response to the application being installed in the user terminal and the identification information being received from the user terminal via the Appstore App;
storing the identification information in a database and generating a matching key for the identification information in response to a determination of the Appstore App not being installed in the user terminal;
providing, to the user terminal, a link for downloading a file, the file comprising the matching key and an installation file of the Appstore App being merged; and
verifying the identification information corresponding to the matching key from the database in response to the Appstore App being installed in the user terminal and the matching key being received from the user terminal via the Appstore App.

5. A marketing channel tracking system comprising:
a memory to which programming is loaded; and
a processor,
wherein, according to a control of the programming, the processor is configured to perform processes comprising:
generating identification information, to identify an editor and an application corresponding to the editor, the editor providing a marketing channel of the application;
receiving the identification information transferred from the editor to a user terminal via the marketing channel; and
storing the identification information corresponding to a user terminal in response to the user terminal downloading the application via the marketing channel,
wherein the storing comprises:
identifying a download of the application via the marketing channel using the identification information transferred from the editor via the user terminal;
identifying the application using the identification information;
providing a link for downloading the application to the user terminal in response to an Appstore App for providing an Appstore service being installed in the user terminal;
storing the identification information in association with the user terminal in response to the application being installed in the user terminal and the identification information being received from the user terminal via the Appstore App;
storing the identification information in a database and generating a matching key for the identification information in response to a determination of the Appstore App not being installed in the user terminal;
providing, to the user terminal, a link for downloading a file, the file comprising the matching key and an installation file of the Appstore App being merged; and
verifying the identification information corresponding to the matching key from the database in response to the Appstore App being installed in the user terminal and the matching key being received from the user terminal via the Appstore App.

6. The marketing channel tracking system of claim 5, wherein the marketing channel comprises an online route via which the editor promotes the application and induces download of the application.

7. The marketing channel tracking system of claim 5, wherein the identification information is received from the user terminal according to a control of an Appstore App installed in the user terminal to provide an Appstore service.

* * * * *